United States Patent
Shinmura et al.

(10) Patent No.: US 11,035,052 B2
(45) Date of Patent: Jun. 15, 2021

(54) HIGHLY ALKALI-RESISTANT ALUMINUM MEMBER

(71) Applicant: AISIN KEIKINZOKU CO., LTD., Imizu (JP)

(72) Inventors: Jin Shinmura, Toyama (JP); Yohei Kanatani, Takaoka (JP); Ryota Kakizawa, Toyama (JP)

(73) Assignee: AISIN KEIKINZOKU CO., LTD.

(*) Notice: Subject to any disclaimer, the term of this patent is extended or adjusted under 35 U.S.C. 154(b) by 0 days.

(21) Appl. No.: 16/158,875

(22) Filed: Oct. 12, 2018

(65) Prior Publication Data

US 2019/0040541 A1 Feb. 7, 2019

Related U.S. Application Data

(63) Continuation of application No. 15/386,408, filed on Dec. 21, 2016, now abandoned, which is a
(Continued)

(30) Foreign Application Priority Data

Jun. 25, 2014 (JP) .............. JP2014-130188

(51) Int. Cl.
    *C25D 11/18*  (2006.01)
    *C25D 11/24*  (2006.01)
    (Continued)

(52) U.S. Cl.
    CPC ............ *C25D 11/18* (2013.01); *C03C 3/06* (2013.01); *C03C 4/20* (2013.01); *C23D 3/00* (2013.01);
    (Continued)

(58) Field of Classification Search
    CPC .................................. B05D 2202/25
    See application file for complete search history.

(56) References Cited

U.S. PATENT DOCUMENTS

| | | | |
|---|---|---|---|
| 4,431,489 A * | 2/1984 | Baker | C25D 11/22 205/202 |
| 6,797,014 B1 * | 9/2004 | Schofberger | C25D 11/243 8/522 |

(Continued)

FOREIGN PATENT DOCUMENTS

| | | |
|---|---|---|
| CN | 101885257 A | 11/2010 |
| JP | H06-306333 A | 11/1994 |

(Continued)

OTHER PUBLICATIONS

M. Whelan, J. Cassidy, B. Duffy. Sol-gel sealing characteristics for corrosion resistance of anodised aluminum. Surface and Coatings Technology. vol 235. pp. 86-96 (Year: 2013).*

(Continued)

*Primary Examiner* — Dah-Wei D. Yuan
*Assistant Examiner* — Kristen A Dagenais-Englehart
(74) *Attorney, Agent, or Firm* — Harness, Dickey & Pierce, P.L.C.

(57) ABSTRACT

An aluminum member exhibits improved alkali resistance with respect to an anodic oxide coating. The highly alkali-resistant aluminum member includes a material that includes aluminum or an aluminum alloy, an anodic oxide coating
(Continued)

| | Thickness of anodic oxide coating | Hot water immersion conditions | Thickness of vitreous coating layer | Adhesion | Alkali resistance |
|---|---|---|---|---|---|
| Example 1 | 10μm | 80℃×5min | 0.5μm | Good | Good |
| Example 2 | 10μm | 80℃×20min | 5.0μm | Good | Good |
| Example 3 | 10μm | 85℃×25min | 3.0μm | Good | Good |
| Comparative Example 1 | 10μm | 95℃×20min | 0μm | — | Bad |
| Comparative Example 2 | 10μm | 80℃×5min | 0.4μm | Good | Bad |
| Comparative Example 3 | 10μm | 90℃×20min | 3.0μm | Bad | Good | that is formed on the surface of the material, and a coating layer that is formed on the anodic oxide coating, and includes a siloxane glass component in a ratio of 90 mass % or more, wherein the coating layer has a thickness of 0.5 to 5.0 μm and a coating mass of 0.4 to 5.0 g/m$^2$.

6 Claims, 1 Drawing Sheet

Related U.S. Application Data continuation of application No. PCT/JP2015/063478, filed on May 11, 2015.

(51) Int. Cl.
| | | |
|---|---|---|
| *C25D 11/06* | (2006.01) | |
| *C03C 3/06* | (2006.01) | |
| *C03C 4/20* | (2006.01) | |
| *C23D 3/00* | (2006.01) | |
| *C23D 5/02* | (2006.01) | |
| *C23D 13/00* | (2006.01) | |
| *C25D 11/14* | (2006.01) | |
| *C25D 11/22* | (2006.01) | |

(52) U.S. Cl.
CPC ............... *C23D 5/02* (2013.01); *C23D 13/00* (2013.01); *C25D 11/06* (2013.01); *C25D 11/14* (2013.01); *C25D 11/24* (2013.01); *C25D 11/246* (2013.01); *B05D 2202/25* (2013.01); *C25D 11/22* (2013.01); *C25D 11/243* (2013.01)

(56) References Cited

U.S. PATENT DOCUMENTS

| | | | | |
|---|---|---|---|---|
| 2002/0142150 | A1* | 10/2002 | Baumann | B08B 17/065 428/328 |
| 2009/0238986 | A1* | 9/2009 | Gross | C09D 183/08 427/458 |
| 2015/0034487 | A1* | 2/2015 | Danzebrink | C23C 18/1254 205/50 |

FOREIGN PATENT DOCUMENTS

| | | |
|---|---|---|
| JP | H06-316787 A | 11/1994 |
| JP | H08-120490 A | 5/1996 |
| JP | H11-229187 A | 8/1999 |
| JP | 4176581 B2 | 11/2008 |
| JP | 4248818 B2 | 4/2009 |

OTHER PUBLICATIONS

International Search Report for PCT/JP2015/063478 dated Jul. 7, 2015.
M. Whelan et al., "Sol-Gel Sealing Characteristics for Corrosion Resistance of Anodised Aluminum", Surface Coatings and Technology, vol. 235, pp. 86-96 (2013).
H. Jha et al., "Area-Selective Microscale Metallization on Porous Anodic Oxide Film of Aluminum", Electrochemistry Communications, vol. 9, No. 7, pp. 1596-1601 (2007).

* cited by examiner

| | Thickness of anodic oxide coating | Hot water immersion conditions | Thickness of vitreous coating layer | Adhesion | Alkali resistance |
|---|---|---|---|---|---|
| Example 1 | 10 μm | 80°C × 5min | 0.5 μm | Good | Good |
| Example 2 | 10 μm | 80°C × 20min | 5.0 μm | Good | Good |
| Example 3 | 10 μm | 85°C × 25min | 3.0 μm | Good | Good |
| Comparative Example 1 | 10 μm | 95°C × 20min | 0 μm | — | Bad |
| Comparative Example 2 | 10 μm | 80°C × 5min | 0.4 μm | Good | Bad |
| Comparative Example 3 | 10 μm | 90°C × 20min | 3.0 μm | Bad | Good |

HIGHLY ALKALI-RESISTANT ALUMINUM MEMBER

CROSS REFERENCE TO RELATED APPLICATIONS

This application is a continuation of U.S. patent application Ser. No. 15/386,408, filed Dec. 21, 2016, which is a continuation of International Patent Application No. PCT/JP2015/063478, designating the United States, and having an international filing date of May 11, 2015, and which claims priority to Japanese Patent Application No. 2014-130188 filed on Jun. 25, 2014. The disclosures of the above applications are hereby expressly incorporated by reference herein in their entireties.

TECHNICAL FIELD

The present invention relates to a member that is formed of aluminum or an aluminum alloy, and exhibits excellent alkali resistance.

BACKGROUND

An anodic oxide coating is formed on aluminum or an aluminum alloy that is used for exterior parts in order to provide sufficient corrosion resistance.

Such an anodic oxide coating exhibits relatively excellent acid corrosion resistance, but easily undergoes surface whitening when exposed to an alkali. Therefore, such an anodic oxide coating is unsatisfactory when applied to the exterior parts of an automobile, for example.

In the field of building materials, alkali resistance is improved by forming an electrodeposition coating after forming an anodic oxide coating. However, such an electrodeposition coating has a problem in that it is easily damaged, and an aluminum material provided with an electrodeposition coating is easily damaged and removed during car washing when used for automotive parts.

Japanese Patent No. 4248818 and Japanese Patent No. 4176581 disclose technology that applies a silane coupling agent to an anodic oxide coating, and apply a coating material thereto. Note that the silane coupling agent is used to improve the adhesion of the coating, and cannot provide sufficient corrosion resistance.

JP-A-6-316787 discloses technology that immerses an anodic oxide coating in a mixed alcohol solution including an alkoxysilane and HCl.

However, the technology disclosed in JP-A-6-316787 aims to fill the pores in the anodic oxide coating with $SiO_2$, and cannot form a coating layer on the anodic oxide coating.

SUMMARY OF THE INVENTION

An object of the invention is to provide an aluminum member that is formed of an aluminum or an aluminum alloy and exhibits improved alkali resistance with respect to an anodic oxide coating.

According to one aspect of the invention, there is provided a highly alkali-resistant aluminum member comprising:

a material that comprises aluminum or an aluminum alloy;

an anodic oxide coating that is formed on a surface of the material; and a coating layer that is formed on the anodic oxide coating, and comprises a siloxane glass component in a ratio of 90 mass % or more, wherein the coating layer has a thickness of 0.5 to 5.0 μm and a coating mass of 0.4 to 5.0 $g/m^2$.

Note that the expression "the coating layer includes a siloxane glass component in a ratio of 90 mass % or more" means that the coating layer includes a vitreous component having a siloxane bond (Si—O—Si) in a ratio of 90 mass % or more.

Such a coating layer is obtained by applying a coating material that includes an alkoxysiloxane compound in a ratio of 50 mass % or more to the anodic oxide coating, and drying the applied coating material.

The alkoxysiloxane is hydrolyzed on the surface of the anodic oxide coating, and hardens or cures at room temperature.

When the coating layer includes a siloxane glass component in a ratio of 90 mass % or more, the coating layer forms a transparent and hard coating layer.

The coating layer exhibits higher transparency when the coating layer includes a siloxane glass component in a ratio of 95 mass % or more.

When the anodic oxide coating is a sulfuric acid electrolytic coating or an oxalic acid electrolytic coating that has been subjected to a hot water treatment or a semi-sealing treatment, the siloxane glass coating layer exhibits improved adhesion.

The anodic oxide coating may be a colored coating.

According to another aspect of the invention, a method for producing a highly alkali-resistant aluminum member includes: forming an anodic oxide coating having a thickness of 5 to 20 μm on the surface of a material that includes aluminum or an aluminum alloy; subjecting the material to a hot water treatment or a semi-sealing treatment in hot water at 70 to 85° C. for 5 to 30 minutes; and applying an alkoxysiloxane coating material to the anodic oxide coating, and drying the applied alkoxysiloxane coating material.

The term "sulfuric acid electrolytic coating" used herein refers to an anodic oxide coating formed in a sulfuric acid aqueous solution (electrolyte solution), and the term "oxalic acid electrolytic coating" used herein refers to an anodic oxide coating formed in an oxalic acid aqueous solution (electrolyte solution).

The method may include coloring the anodic oxide coating formed on the material, and then subjecting the material to the hot water treatment or the semi-sealing treatment.

The anodic oxide coating may be colored by secondary electrolytic coloring or dyeing.

According to the invention, since the material that includes aluminum or an aluminum alloy is provided with the siloxane glass coating layer that is formed on the anodic oxide coating, the material exhibits excellent corrosion resistance in an acidic environment, and also exhibits excellent alkali resistance.

Since the coating layer is transparent and glossy, the texture of the anodic oxide coating and the metallic luster of the surface of the material can be maintained.

BRIEF DESCRIPTION OF DRAWINGS

FIG. 1 illustrates surface treatment conditions and evaluation results.

DESCRIPTION OF EMBODIMENTS

Production examples and evaluation results with regard to the aluminum or aluminum alloy member according to the invention are described below.

An aluminum alloy extruded material was subjected to an electrolytic treatment in a sulfuric acid aqueous solution to form an anodic oxide coating according to an ordinary method.

The thickness of the coating was 10 μm.

The extruded material was immersed in hot water at 80 to 95° C. for 5 to 20 minutes (see FIG. 1).

After drying the extruded material, an alkoxysiloxane coating material was applied to the extruded material, and the extruded material was dried at room temperature.

The coating material ("TOP NOTCH COAT TN-7000" manufactured by JSP Co., Ltd.) had an alkoxysiloxane content of 50 mass % or more.

Note that the thickness of the coating layer was changed by changing the amount of the coating material applied to the extruded material. The thickness of the vitreous coating layer after drying is listed in FIG. 1.

The adhesion target and the alkali resistance target were set as described below taking account of application to the exterior parts of an automobile.

Adhesion

The specimen was immersed in purified water at 40° C. for 360 hours. After cutting the vitreous coating layer into 1×1 mm squares, a peel test using an adhesive cellophane tape was performed. A case where no square was peeled (removed) (0/100) was evaluated as "Good".

Alkali Resistance

The specimen was immersed in a ⅒ N sodium hydroxide aqueous solution (20° C.) for 20 minutes, washed, and dried.

A case where no discoloration was observed was evaluated as "Good".

The following were confirmed from the results listed in FIG. 1.

(1) The adhesion was evaluated as "Good" when the extruded material on which the anodic oxide coating was formed was immersed in hot water at 80° C. for 5 minutes (see Example 1 and Comparative Example 2).

The adhesion was evaluated as "Bad" when the extruded material was immersed in hot water at 90° C. for 20 minutes (see Comparative Example 3).

Specifically, since a decrease in adhesion occurs as the degree of sealing of the anodic oxide coating increases, it is preferable to perform the hot water treatment so as to wash an acid that remains in the anodic oxide coating, or perform the semi-sealing treatment so that complete sealing does not occur.

Therefore, it is preferable to perform the hot water treatment or the semi-sealing treatment by immersing the extruded material in hot water at 70 to 85° C. for 5 to 30 minutes.

When the immersion time is set to about 5 to 20 minutes, it is preferable to use hot water at 75 to 85° C.

The alkali resistance was evaluated as "Bad" when the thickness of the vitreous coating layer was 0.4 μm (see Comparative Example 2). Therefore, it is preferable to set the thickness of the vitreous coating layer to 0.5 to 5.0 μm (see Examples 1 to 3).

The coating mass of the vitreous coating layer was 0.4 to 5.0 g/m$^2$ when the thickness of the vitreous coating layer was 0.5 to 5.0 μm.

In the examples, a sulfuric acid electrolytic coating that was formed using a sulfuric acid aqueous solution and had a thickness of 10 μm was used as the anodic oxide coating. It is preferable that the anodic oxide coating have a thickness of 5 to 20 μm when used for the exterior parts of an automobile. The anodic oxide coating may be an oxalic acid electrolytic coating having a thickness within the above range.

Aluminum or an aluminum alloy that is used as the material may have been subjected to a mechanical finish (e.g., buffing) or a chemical finish (e.g., chemical polishing and electrolytic polishing).

When the material has been subjected to such a gloss finish, it is possible to obtain excellent alkali resistance while maintaining gloss by means of the surface treatment according to the invention.

The anodic oxide coating may be colored by secondary electrolytic coloring or dyeing.

What is claimed is:

1. A method for producing an alkali-resistant aluminum member comprising:

forming an anodic oxide coating having a thickness of 5 to 20 μm on a surface of a material that includes aluminum or an aluminum alloy in a sulfuric acid aqueous solution or in an oxalic acid aqueous solution;

subjecting the material having the anodic oxide coating to a hot water treatment or a semi-sealing treatment in hot water at 70 to 85° C. for 5 to 30 minutes so as to wash away remaining sulfuric acid or oxalic acid; and thereafter applying an alkoxysiloxane coating material to the heated anodic oxide coating, and drying the applied alkoxysiloxane coating material to form a coating layer on the anodic oxide coating, wherein the applying and drying of the alkoxysiloxane coating material results in the coating layer comprising a siloxane glass component in a ratio of 90 mass % or more occupied in the coating layer, and wherein no discoloration of the alkali-resistant aluminum member is observed after being immersed in a ⅒ N sodium hydroxide aqueous solution at 20° C. for 20 minutes, washed, and dried.

2. The method for producing an alkali-resistant aluminum member as defined in claim 1, wherein the alkoxysiloxane coating material has a concentration that includes an alkoxysiloxane compound in a ratio of 50 mass % or more.

3. The method for producing an alkali-resistant aluminum member as defined in claim 1, wherein the applying and drying of the alkoxysiloxane coating material results in a thickness of the coating layer of 0.5 to 5.0 μm, and a coating mass of 0.4 to 5.0 g/m2.

4. The method for producing an alkali-resistant aluminum member as defined in claim 1, further comprising:

coloring the anodic oxide coating before subjecting the material to the hot water treatment or the semi-sealing treatment.

5. The method for producing an alkali-resistant aluminum member as defined in claim 1, wherein the hot water treatment washes away any remaining sulfuric acid aqueous solution or oxalic acid aqueous solution.

6. The method for producing an alkali-resistant aluminum member as defined in claim 1, wherein the semi-sealing treatment causes partial, but not complete, sealing.

* * * * *